United States Patent [19]
Gregory

[11] 3,918,697
[45] Nov. 11, 1975

[54] MACHINE FOR ROTATABLE SUPPORTING A TANK DURING THE MANUFACTURE THEREOF

[76] Inventor: Kenneth H. Gregory, Rte. 2, Box 229, Cadott, Wis. 54727

[22] Filed: July 15, 1974

[21] Appl. No.: 488,454

[52] U.S. Cl. .............. 269/289; 214/1 QC; 214/340; 228/48
[51] Int. Cl.² .......................................... B23Q 3/00
[58] Field of Search ......... 214/1 QC, 338, 339, 340; 228/48; 269/55, 289

[56] References Cited
UNITED STATES PATENTS
| | | | |
|---|---|---|---|
| 2,346,613 | 4/1944 | Rumsey | 214/1 QC |
| 3,185,454 | 5/1965 | Kamalian | 214/340 |
| 3,250,415 | 5/1966 | Wuesthoff | 214/340 |
| 3,258,144 | 6/1966 | Reschke | 214/340 |

*Primary Examiner*—Roy Lake
*Assistant Examiner*—Mark S. Bicks
*Attorney, Agent, or Firm*—Douglas L. Carlsen

[57] ABSTRACT

A machine which supports one end of a cylindrical tank while the circular head or tank end is welded to the cylindrical wall of the tank, the machine having rollers which support a belt upon which the cylindrical wall of the tank rests. Power means drive the rollers to move the belt thereover and slowly rotate the tank about its center axis during the welding operation. The rollers are adjustable toward and away from each other to vary the length of the tank supporting portion of the belt to accommodate different sized tanks.

3 Claims, 3 Drawing Figures

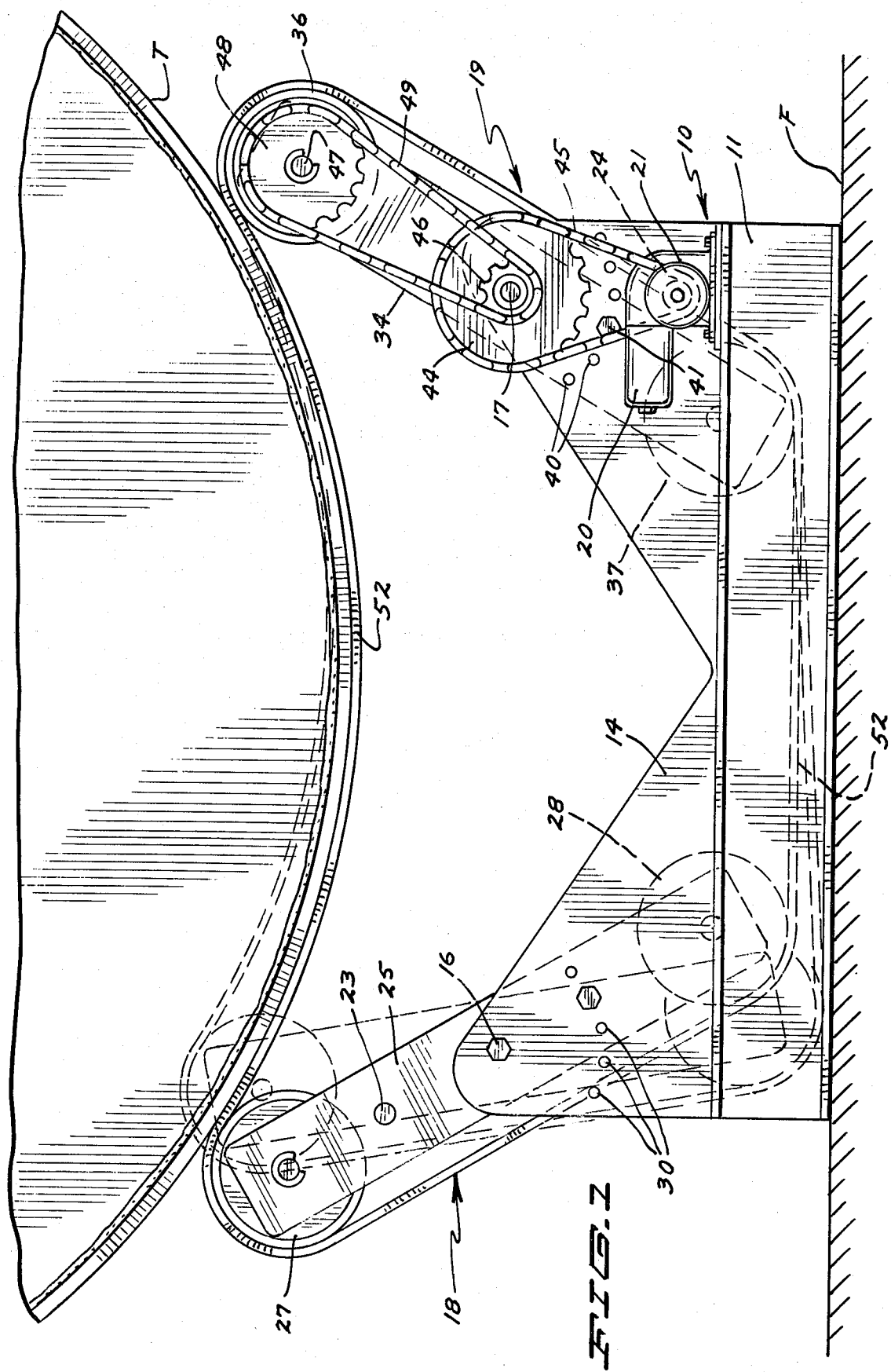

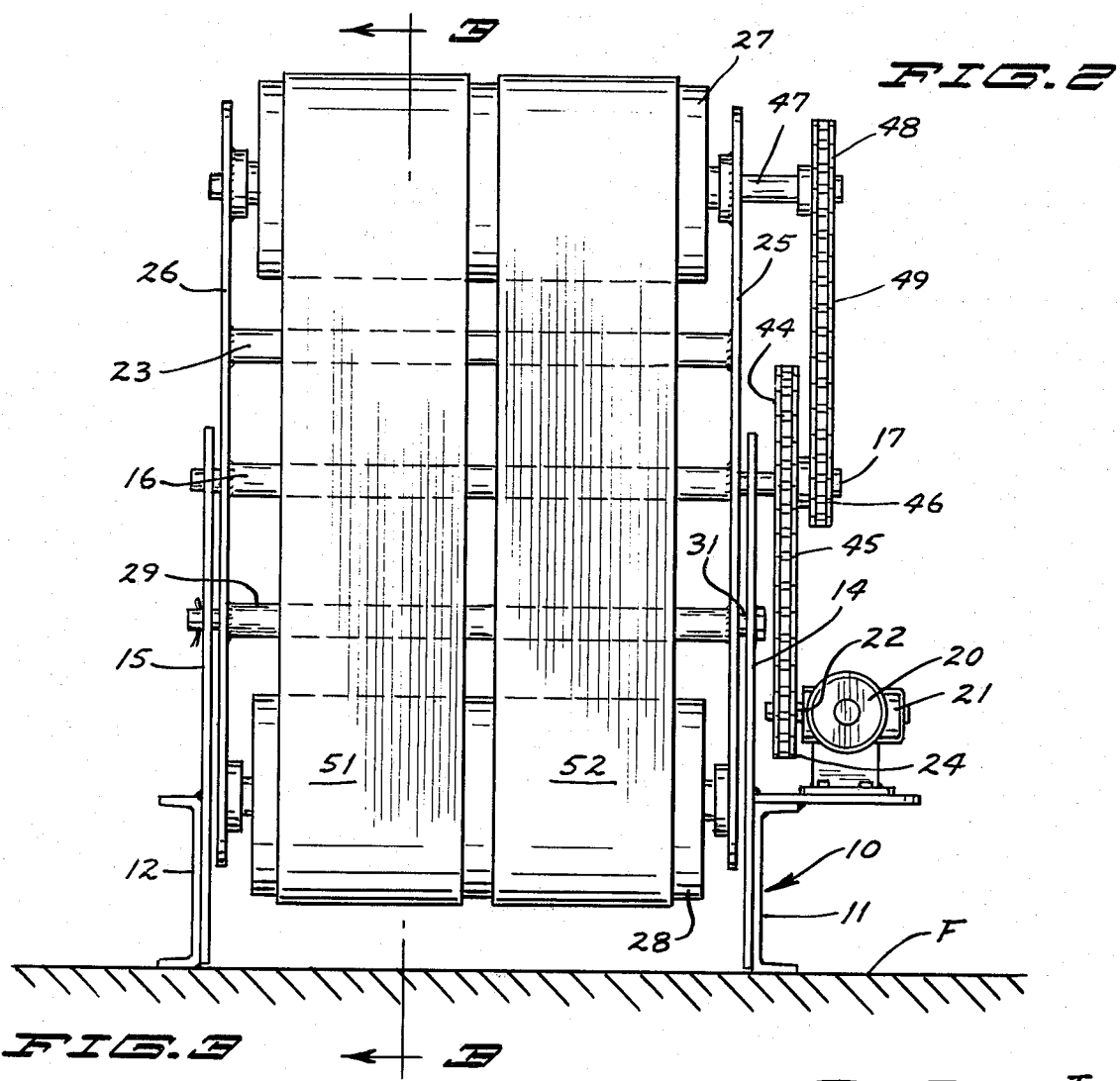
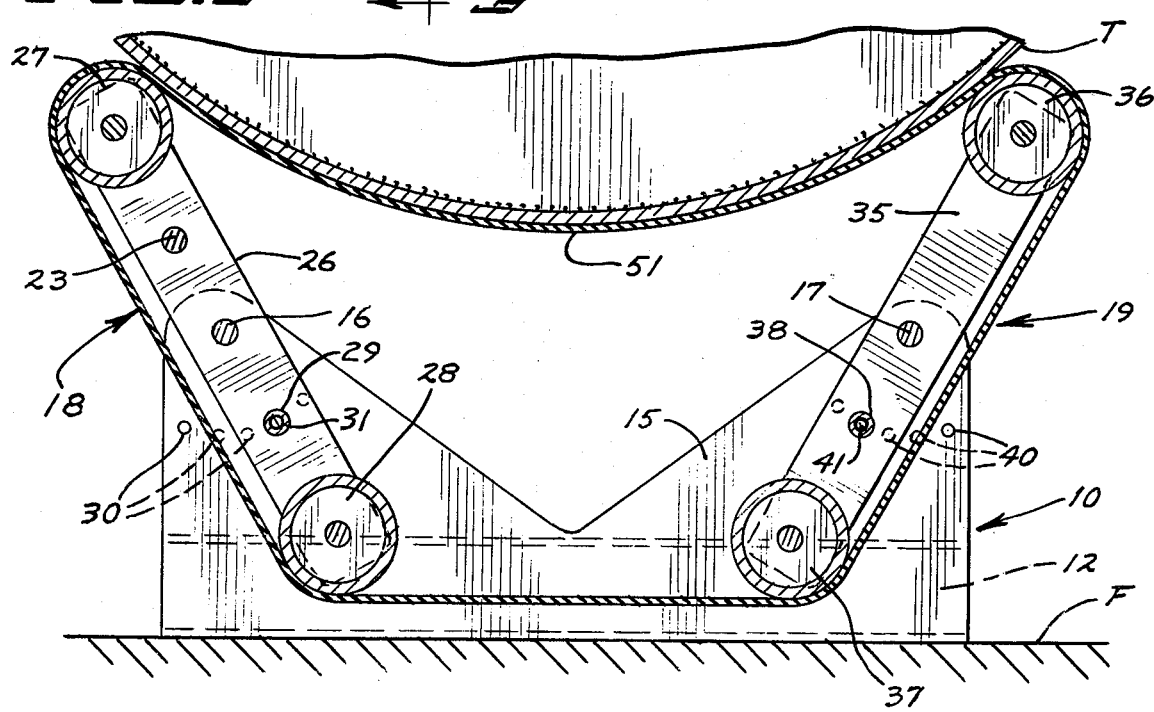

MACHINE FOR ROTATABLE SUPPORTING A TANK DURING THE MANUFACTURE THEREOF

BACKGROUND OF THE INVENTION

This invention pertains generally to apparatus for supporting large cylindrical metal containers such as tanks during the manufacture thereof. It particularly concerns supporting the container while the heads or ends are welded to the cylindrical wall.

In welding the head on a large cylindrical tank it is desirable that the tank be rotated about its cylindrical axis during the welding operation with the components to be welded passing continuously through the working zone. While machinery has been provided in the past for performing this type of operation, it has not been satisfactory from a commercial standpoint for several reasons.

Examples of the prior art are found in U.S. Pat. Nos. 2,669,364 to Aronson, 3,185,454 to Kamalian, and 3,799,361 to Rey. While the structures disclosed in these patents are directed toward solving the same problem as the applicant's machine, they are not completely effective for various reasons. In some instances they are difficult to set up. Other machines do not rotate the tank smoothly enough to be used with automatic welders or are not designed to accommodate heavy or different sized tanks. Perhaps the greatest faults with machines used for this purpose heretofore is the fact that they utilized rollers or chains in direct contact with the tanks which creased or otherwise damaged the cylindrical walls thereof.

SUMMARY OF THE INVENTION

An object of the present invention is to provide a machine for supporting and rotating one end of a cylindrical tank while the head is welded onto the tank and which is adapted to perform said supporting and rotating functions without denting or otherwise damaging the tank.

Another object of the invention is to provide a machine for supporting and rotating one end of a cylindrical tank which is designed to support tanks of great weight and which is adjustable to support tanks of different diameters.

With these and other objects in view the invention broadly comprises a base frame supporting upper and lower pairs of rollers journaled on parallel horizontal axes and which function as pulleys having an endless belt trained therearound. The upper pair of rollers are at a common level and are mounted on arms which are adjustable to move the rollers toward and away from each other to vary the length of the belt run therebetween to accommodate tanks of varying diameters.

BRIEF DESCRIPTION OF THE DRAWINGS

In the drawings:

FIG. 1 is a front elevation of the machine supporting one end of a cylindrical tank and with an alternate position of one roller and support arm shown in broken lines at the left side of the drawing.

FIG. 2 is an end elevational view of the machine.

FIG. 3 is a vertical section through the machine taken on line 3—3 of FIG. 2.

DESCRIPTION OF THE PREFERRED EMBODIMENT

Referring now more particularly to the drawings reference numerals will be used to denote like parts or structural features in the different views. The machine is herein shown supporting one end of a large cylindrical tank T. It will be understood that a comparable mechanism is provided to support the opposite end of the tank.

The base frame of the machine is denoted generally at 10 and includes front and rear channel beams 11 and 12 which are welded or otherwise suitably connected to vertical parallel front and rear support plates 14 and 15. These plates are interconnected by left and right cross shafts 16 and 17 and may be suitably braced by other cross beams or the like (not shown) near the floor F.

The left side of the machine as viewed in FIG. 1 and indicated generally by the number 18 will be referred to herein as the idler side while the right side indicated generally by the number 19 will be referred to as the power side. On the power side an electric motor 20 drives a gear reduction unit 21. Unit 21 drives the shaft 22 which has the sprocket 24 mounted thereon.

On the idler side 18 the machine has a pair of elongated conveyor support bars 25 and 26 which are journaled medially on the shaft 16. These bars jointly support an upper roller or drum 27 and a lower roller 28.

Bars 25 and 26 are also interconnected by a cross rod 23 and a tubular member 29, the latter being spaced downwardly below the shaft 16. The support plates 14 and 15 each has a series of apertures 30 which are spaced along an arcuate row having the axis of shaft 16 as the center. The apertures 30 in the plates 14 and 15 are horizontally aligned in pairs to jointly receive a locking pin 31 which extends through member 29 and a pair of said apertures. This pin may be locked against endwise displacement by cotter pins or the like extending through passages in the end portions of locking pin 31.

It will accordingly be understood that the components on the idler side 18, namely, the side bars 25 and 26 and rollers 27 and 28, can be moved as a unit about the axis of shaft 16 and locked in any selected one of several positions by the locking pin 31. The purpose of this is primarily to adjust roller 27 inwardly or outwardly relative to the center of the machine.

The power side 19 of the machine has a similar assembly as that just described with front and rear conveyor support bars 34 and 35 journaled medially on the shaft 17. These bars jointly support an upper roller 36 and a lower roller 37 for rotation on parallel axes. Bars 34 and 35 are also interconnected by a tubular member 38 spaced downwardly below shaft 17. Here again each of the support plates 14 and 15 is provided with a series of apertures 40 spaced along an arcuate row having the axis of shaft 17 as the center. Apertures 40 in bars 34 and 35 are horizontally aligned in pairs to jointly receive a locking pin 41 which extends through the tubular member 38 and a pair of said apertures. Here again pin 41 is locked against endwise displacement in any suitable manner.

The assembly comprised of bars 34 and 35 and 36 and 37 may be adjusted as a unit about the axis of shaft 17 and locked in any selected position by pin 41.

Shaft 17 to the front of plate 14 carries a large sprocket 44 in vertical alignment with the sprocket 24 on the gear reduction unit. Sprockets 24 and 44 have a driving connection through chain 45. Also mounted on shaft 17 and forward of large sprocket 44 is a small sprocket 46. The upper roller 36 on the power side of the machine is mounted on a shaft 47 which also carries a large sprocket 48 which is in vertical alignment with sprocket 46 and connected thereto by means of a drive chain 49.

It will be understood that regardless of the position of adjustment of the bars 34 and 35 the sprockets 24, 44 and 46 will not move as the shafts 22 and 17 are in fixed positions. Also while shaft 47 will be moved when the bars are adjusted the drive between sprockets 45 and 48 will not be affected as the spacing between shafts 47 and 17 remains constant.

It will also be understood that drum or roller 36 is power driven when the machine is operative with the drive train going from motor 20, through gear reduction unit 21, shaft 22, and drive chains 45 and 49 to sprocket 48 and shaft 47.

A pair of endless belts 51 and 52 are trained about the rollers 27, 28, 36 and 37 in side by side position. The run or span of the belts between the upper rollers 27 and 36 forms a sling to support the tank T and as the belts move under the power rotation of roller 36 the tank is slowly rotated while welding or other operations are performed thereon.

The upper drums are moved closer together to support smaller tanks and away from each other to support the larger, it being understood that the arc of curvature of the top run or sling of the belts decreases as the rollers are moved closer and increases as they are separated. The cylindrical wall of tank T rests completely on the flexible belts 51 and 52, thus eliminating any damage to the wall during rotation.

Having now therefore fully illustrated and described my invention, what I claim to be new and desire to protect by Letters Patent is:

1. A machine for supporting and rotating the end of a cylindrical tank comprising, a. a base frame,
b. support means journaling upper and lower pairs of rollers on the frame on parallel axes with the upper pair being in substantial horizontal alignment,
c. an endless belt of flexible material trained around all of said rollers and having slack between said upper rollers to provide a curved sling for holding one end of a cylindrical tank,
d. motor means mounted on the frame for rotationally driving one of said rollers to move the belt thereover and cause the tank to rotate on its axis within the sling,
e. said support means comprising two pairs of elongated support bars mounted on the base frame in horizontally spaced generally upright positions, each pair of bars having one of the upper rollers journaled in between the upper portions thereof and one of the lower rollers journaled between the lower portions thereof, and
f. at least one pair of said support bars being pivoted medially on a horizontal axis whereby as said one pair of bars is swung about its axis the upper rollers may be moved toward or away from each other to vary the length and curvature of the sling so that each of variously sized tanks are supported on said upper rollers in addition to said sling.

2. The subject matter of claim 1 wherein both pairs of support bars are pivoted medially on parallel axes.

3. The subject matter of claim 1 wherein said one pair of support bars are fixedly connected to each other by a horizontal tubular member, the frame having a series of apertures which are spaced along an arcuate row having the support bar pivot axis as a center, and a locking pin for insertion through said tubular member and any selected aperture to lock the support bars against movement about said pivot axis.

* * * * *